US009246947B2

United States Patent
Livne

(10) Patent No.: US 9,246,947 B2
(45) Date of Patent: Jan. 26, 2016

(54) METHOD AND APPARATUS FOR PROTECTING ACCESS TO CORPORATE APPLICATIONS FROM A MOBILE DEVICE

(71) Applicant: Crimson Corporation, Dover, DE (US)

(72) Inventor: Eran Livne, Petah Tikva (IL)

(73) Assignee: Crimson Corporation, Dover, DE (US)

( * ) Notice: Subject to any disclaimer, the term of this patent is extended or adjusted under 35 U.S.C. 154(b) by 0 days.

(21) Appl. No.: 14/243,119

(22) Filed: Apr. 2, 2014

(65) Prior Publication Data

US 2014/0304766 A1    Oct. 9, 2014

Related U.S. Application Data

(60) Provisional application No. 61/807,775, filed on Apr. 3, 2013.

(51) Int. Cl.
 *H04L 29/06* (2006.01)
(52) U.S. Cl.
 CPC ............ *H04L 63/20* (2013.01); *H04L 63/1433* (2013.01)

(58) Field of Classification Search
 CPC ........................... H04L 63/20; H04L 63/1433
 See application file for complete search history.

(56) References Cited

U.S. PATENT DOCUMENTS

| 8,578,261 | B1 * | 11/2013 | Gupta et al. | 715/208 |
|---|---|---|---|---|
| 2006/0206711 | A1 * | 9/2006 | Chakraborty | 713/170 |
| 2008/0083012 | A1 * | 4/2008 | Yu et al. | 726/1 |
| 2010/0064341 | A1 * | 3/2010 | Aldera | 726/1 |
| 2011/0131478 | A1 * | 6/2011 | Tock et al. | 715/208 |

* cited by examiner

*Primary Examiner* — Andrew Nalven
*Assistant Examiner* — Mary Li
(74) *Attorney, Agent, or Firm* — Austin Rapp & Hardman

(57) ABSTRACT

A computer-implemented method, apparatus and computer program product for providing secure consumption of applications from mobile devices, The method comprises receiving a security policy associated with usage of an application by a user using a mobile device, the security policy comprising at least one vulnerability indication; receiving at least partial code of the application; identifying at least one JavaScript instruction in the code, the at least one JavaScript instruction associated with the security vulnerability; and adding additional JavaScript instructions to the code for handling the security vulnerability.

15 Claims, 3 Drawing Sheets

METHOD AND APPARATUS FOR PROTECTING ACCESS TO CORPORATE APPLICATIONS FROM A MOBILE DEVICE

TECHNICAL FIELD

The present disclosure relates to mobile devices in general, and to a method and apparatus for securely accessing organizational applications from mobile devices, in particular.

BACKGROUND

In recent decades, electronic technology, including communication technology, has revolutionized our everyday lives. Electronic devices such as PDAs, mobile phones, mobile media players, and digital cameras, or the like, have permeated the lives of almost every person living in the developed world, and quite a number of people living in undeveloped countries. Mobile communication and computing devices, especially, have become the means by which countless millions conduct their personal and professional interactions with the world. It has become almost impossible for many people, especially those in the business world, who use these devices as a means to improve productivity, to function without access to their electronic devices.

In particular, many users use their mobile devices to connect to a server, such as an application server of an organization or corporate they are associated with. Thus, an organization, such as a commercial corporate, a governmental organization, an educational institute or others may wish to provide access to one or more applications and in particular web applications to a multiplicity of users, such as employees, clients, prospective clients, providers, sun-contractors, business partners or other affiliates or other individuals.

However, the application and data that may be provided to a user by the application may have to be under security limitations dictated by the organization. First, user identification may be required, followed by authorization clearance. An organization may define which users may access which applications or features thereof, wherein such authorization may depend on any one or more of the following: the application or feature thereof, the user's identity or group association, the user's mobile device type, the user's location, or other parameters which may change over time.

It will be appreciated that even after initial authorization is cleared, there may still be multiple security issues related to data exchange, that may be have to be monitored or handled throughout the communication session.

For example, authorization issues may come up during the communication if the user tries to perform actions that may or may not be allowed. Further issues may relate to: downloading files to the user: whether such downloading is legitimate and under what conditions; whether storing data received from an application on the user's device is allowed or prohibited and under what conditions; issues related to handling cookies, or the like.

In order to enable a user to work comfortably in a familiar environment, it may be required to enable each user to execute the remote applications in a browser of his or her choice which may or may not be the native browser of the device, rather than requiring all users to work on a specific secure browser.

BRIEF SUMMARY

One aspect of the disclosed subject matter relates to a computer-implemented method performed by a computerized device, comprising: receiving a security policy associated with usage of an application by a user using a mobile device, the security policy comprising one or more vulnerability indications; receiving at least partial code of the application; identifying one or more JavaScript instructions in the code, the JavaScript instructions associated with the security vulnerability; and adding additional JavaScript instructions to the code for handling the security vulnerability. Within the method, the partial code is optionally a web page or a resource of the application, and adding the additional JavaScript instructions to the partial code is optionally performed when the application is executed by the mobile device. Within the method, adding the additional JavaScript instructions to the code is optionally performed for the application prior to downloading the application to the mobile device. Within the method, the security vulnerability optionally relates to storing information received from the application on the mobile device. The method may further comprise identifying a second security vulnerability associated with one or more items selected from the group consisting of: handling cookies on the mobile device; and accessing external URLs from the mobile device. The method may further comprise identifying a second security vulnerability associated with attempt to download a file to the mobile device; and protecting the file by presenting the file to a user using a secure application or a web browser without downloading the file to the mobile device. Within the method, the security policy is optionally determined based upon the application and an identity of a user of the mobile device. Within the method, the security policy is optionally determined based upon a geographic location of the mobile device. The method may be performed by a gateway server, and wherein the mobile device and an application server may communicate through the gateway server when the mobile device executes the application.

Another aspect of the disclosed subject matter relates to a computerized apparatus having a processor, the processor being adapted to perform the steps of: receiving a security policy associated with usage of an application by a user using a mobile device, the security policy comprising one or more vulnerability indications; receiving at least partial code of the application; identifying one or more JavaScript instructions in the code, the JavaScript instructions associated with the security vulnerability; and adding additional JavaScript instructions to the code for handling the security vulnerability. Within the apparatus, the at least partial code is optionally a web page or a resource of the application, and adding the additional JavaScript instructions to the code is optionally performed when the application is executed by the mobile device. Within the apparatus, adding the additional JavaScript instructions to the code is optionally performed for the application prior to downloading the application to the mobile device. Within the apparatus, the security vulnerability optionally relates to storing information received from the application on the mobile device. Within the apparatus the processor is optionally further adapted to identify a second security vulnerability associated with one or more items selected from the group consisting of: handling cookies on the mobile device; and accessing external URLs from the mobile device. Within the apparatus the security policy is optionally determined based upon the application and an identity of a user of the mobile device. Within the apparatus the security policy is optionally determined based upon a geographic location of the mobile device. Within the apparatus the computerized apparatus is optionally a gateway server, and the mobile device and an application server optionally communicate through the gateway server when the mobile device executes the application. Within the apparatus the processor is optionally further adapted to: identify a second security vulnerability associated with attempt to download a file to the mobile device; and protect the file by presenting the file to a user using a secure application or a web browser without downloading the file to the mobile device.

Yet another aspect of the disclosed subject matter relates to a computer program product comprising: a non-transitory computer readable medium; a first program instruction for receiving a security policy associated with usage of an application by a user using a mobile device, the security policy comprising one or more vulnerability indications; a second program instruction for receiving at least partial code of the application; a third program instruction for identifying one or more JavaScript instruction in the code, the JavaScript instruction associated with the security vulnerability; and a fourth program instruction for adding additional JavaScript instructions to the code for handling the security vulnerability, wherein said first, second, third and fourth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
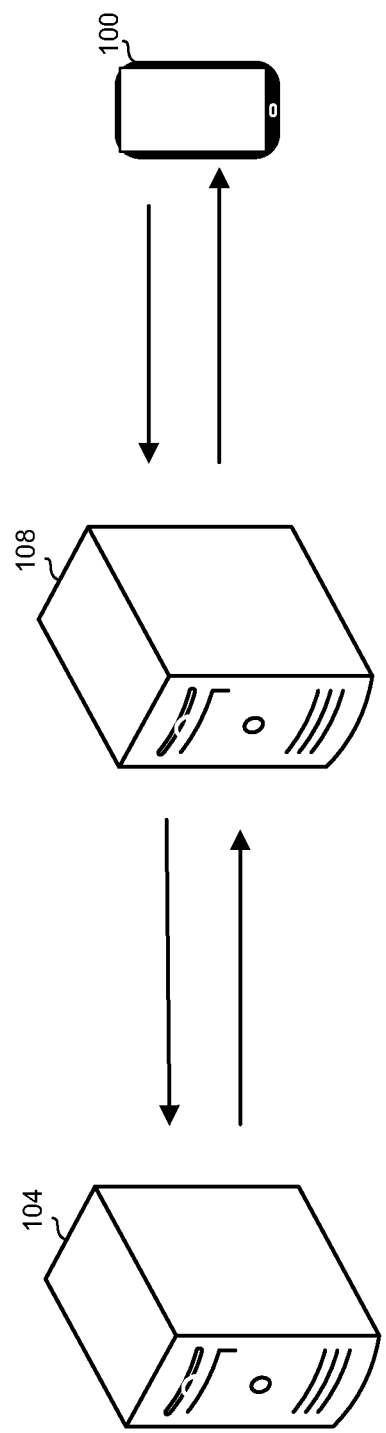
FIG. 1 shows a schematic illustration of components in a computing environment, in accordance with some embodiments of the disclosed subject matter.

In order to increase the usability of mobile devices, there is a need in the art for an apparatus and method for securely using organizational applications, or gaining secure access to corporate data, on a mobile device.

The disclosed subject matter is described below with reference to flowchart illustrations and/or block diagrams of methods, apparatus (systems) and computer program products according to embodiments of the subject matter. It will be understood that some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter relates to an organization, such as a commercial organization, a corporation, a governmental or financial organization, an educational institute, or the like, and users associated with the organization such as employees, customers, potential customers, providers, business partners, affiliates or the like. The users may need to consume data or services provided by the organization, by using applications such as web applications and in particular HTTP or HTTPS applications provided by the organization, on a server accessible to the users, such as an application server and in particular a web server. The users may need or prefer to consume the applications from their mobile devices, such as a mobile phone, a personal digital assistant, a laptop computer, a tablet computer or the like. However, such applications may contain and optionally provide to a user sensitive information, such as sensitive organization information, confidential personal information of one or more individuals, confidential financial information, security-related information or the like. Since the organization may not tolerate compromising on the security of such information, measures have to be taken to ensure that all activities are in compliance with organization policy.

Thus, an administrator or another person or persons in charge may define a policy or set of policies for the organization, specifying what a user or a mobile device may or may not do with the applications or information in order to prevent data leaks or other security hazards.

Policies may refer, for example, to issues including but not limited to any one or more of the following issues:

user identification or authentication, which may be based on user credentials, user identity or group association, mobile device ID or type, user location, time, or other contextual information;

authorization or access control to applications, or to parts or features thereof, which may be based on the user, the mobile device, contextual information as above, or on the application, such as the application type, exchanged data type and classification, or the like;

controlling download of files to the mobile device, e.g., whether to block the files or parts thereof, enable a user to see the files in view-only mode, enable a user to see the files in a special browser, or the like;

ensuring that no data is stored on a mobile device unless and as allowed by the policy;

handling cookies in a secure manner;

ensuring that no actions are taken with regards to the data on the mobile device unless and as allowed by the policy; and preventing access to external links unless and as allowed by the policy.

The policy may also dictate requirements or means for securing data confidentiality during communication, securing user identity and credentials during communication, preventing leakage by securing specific content, e.g., credit card numbers or protecting other sensitive information by enforcing access policy, filtering information, removing improperly provided content or masking it, or the like.

On the other hand, subject to authorization, the applications should be available to a user in a comfortable and familiar manner, for example on a browser of the user's choice which may or may not be the native browser of the mobile device, and not a secure browser or another proprietary browser required by the organization.

One technical solution relates to providing a gateway server that buffers between one or more mobile devices associated with one or more users, and an organization server, for example an application server providing applications and data, such that no direct communication takes place between the mobile device and the organization server. The gateway server executes a gateway application for handling communication between the mobile devices and the application server, and processing the exchanged data. In the description below the terms gateway server and gateway application may be used interchangeably, meaning that actions are performed by the gateway application executed on the gateway server.

One or more of the mobile devices may be installed with an application for communicating with the gateway server, receiving information from the gateway server and performing actions in accordance with the received information.

All organization applications accessible to users are published on the gateway server, and the mobile devices are redirected to access the gateway server instead of the application server for consuming applications.

The gateway server may handle identification issues for identifying the user or the mobile device.

The gateway server may also receive one or more organization policies related for example to security issues as detailed above, and may apply the policies when users access the application server for activating one or more applications (and may be redirected to the gateway server), and throughout the communication that follows. The policies may define access control mapping which users may access which applications, directing users (or user groups) to URLs of applications they can use, or specific functions of these applications. The gateway server may expose these applications only to users allowed in accordance with the corporate policy. The access control policies may also be based on additional contextual information, e.g., location (for example due to local regulations certain materials may not be loaded to a device when the device is in a certain country and features of the device being used), certain capabilities (for example some applications may not be accessible by rooted devices), time, or the like.

Upon receiving a request related to an application from a mobile device, the gateway server may direct the response with or without additional details to the application server. The application server may then return a response to the gateway server. The gateway server may then process the response and apply the policies. Processing may include "wrapping" certain commands, i.e., adding security measures to such commands, for example JavaScript commands associated with certain activities such as storing data on the mobile device.

The proliferation of mobile devices has made HTML5 a dominant format for creating Web sites. One of the features introduced by HTML5 is the ability to store data for offline use, which significantly increased the risk of corporate data being stored locally. Previous security solutions relied on the operating system (OS) of the mobile device to provide the wrapping technology, i.e., to wrap the native OS code. However, as HTML5 is a cross platform standard, meaning it is identical for all OSs, instead of developing a proprietary solution per each OS, wrapping the relevant commands of JavaScript (i.e. the HTML5 commands) provides for protecting corporate information. Thus, it is possible to wrap the standard JavaScript and thus support all browsers and OSs.

Additionally or alternatively, the gateway server may block some of the contents, i.e., not forward the contents to the mobile device, change the behavior of the application, or the like.

The gateway server may also handle security policy issues related to files to be downloaded from the application server to the mobile device as follows: the gateway server may intercept, encrypt and store a file received from the application server on the gateway server, and may send a message or an empty file to the mobile device. Alternatively, the original file can be viewed from the gateway server without downloading it to the device, such that the user can only view it, thus sparing the need to protect the device storage. The application installed on the mobile device may receive the message or the empty file, optionally with indications for the policy to be enforced or the options to be enabled or disabled. The application may then contact the gateway server and display the file, without the file been downloaded to the mobile device. Additionally or alternatively, the device application may then enable the user to take one of the actions allowed in accordance with the policy: view the file with the application or with a browser; view the file in read-only mode; open the file in audited mode in which accesses to the file are registered, or any other limitation or mode.

It will be appreciated that although parts of the file are downloaded to the device's memory for rendering purposes, the file is never stored locally on the device.

All actions and options, including wrapping instructions, may be determined at real time, thus taking into account also the current state of the user and the device. For example, if due to regulations a file containing certain materials may not be downloaded in a particular country, then if the device is at the country the file will not be downloaded.

Alternatively, one or more applications may be pre-wrapped and processed, and then downloaded to the mobile device and executed therefrom, thus ensuring that the application is performed in a secure manner.

The gateway server may also operate in "dry run" mode in which application code is received, vulnerabilities are identified and reported, but the application code is not wrapped or otherwise changed.

The gateway server may handle additional security threats such as cookies storing, accessing external links, or the like.

One technical effect of utilizing the disclosed subject matter is allowing users to consume applicative services and data in a secure manner, using a device of their choice without or with minimal interference, using a browser of their choice which enables them to enjoy the native user experience of their specific device, and does not require them to cede control of their device, e.g., by installing a two-way agent on their personal device.

One technical effect of utilizing the disclosed subject matter is providing an organization with a method and apparatus for publishing HTTP or HTTPS based applications to be accessed from mobile devices, and enabling employees or other people to connect to the organization application server using their mobile devices while complying with organization policies related for example to identification, authorization, data download, local storage, cookies handling or the like.

Referring now to FIG. 1, showing an exemplary environment in which the disclosed method and apparatus are used.

The environment comprises one or more mobile devices 100 which may be any mobile phone, laptop computer, tablet, personal digital assistant, or any other device comprising a processing unit, and communication capabilities. Mobile device 100 may also comprise a browser which may or may not be the device's native browser. Mobile device 100 may also comprise a protective application that provides for authentication, viewing documents in a secure manner, or handle other communication with application server 104 described below.

The environment further comprises an application server 104 associated with an organization, which may provide one or more applications that may be consumed by users through their mobile devices. Application server 104 comprises a processing unit, optional storage device, and communication module and capabilities for communicating with gateway server 108.

In order to allow for security measures, mobile device 100 and application server 104 do not communicate directly but rather via gateway server 108. Users accessing application server 104 may be redirected to gateway server 108. Gateway server 108 comprises a processing unit, optional storage device, and communication module and capabilities for communicating with application server 104 and mobile device 100.

Gateway server 108 may execute a gateway application for receiving one or more applications to be published, and then receive requests from mobile devices for listing the applications or activating any of the applications. The gateway application may process or check the requests in accordance with organization policies, transfer the requests to application server 104, receive responses from application server 104, process the responses and transfer them, optionally with limited content or enhanced commands to mobile device 100. Mobile device 100 may have installed thereon an application responsible for sending information to and receiving information from the gateway server, performing operations such as decrypting encrypted information, accessing URLs, or providing additional functionality. For example, the application may also provide browser functionality if the user prefers to use this browser.

Figure 2:
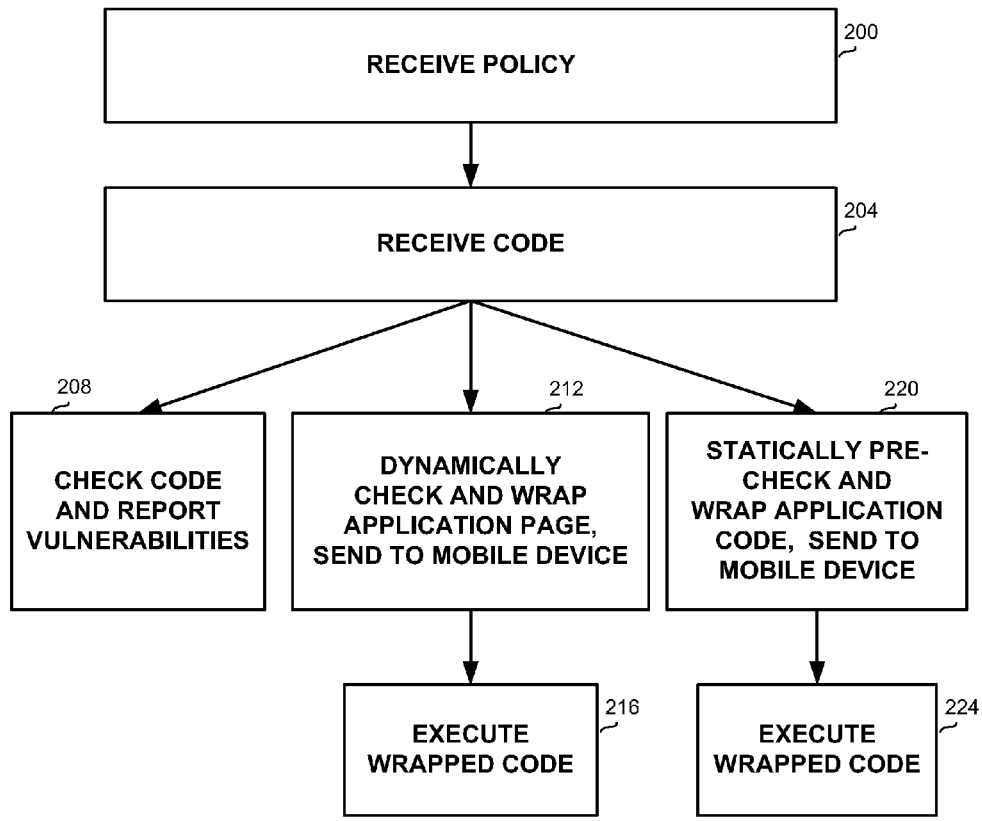
FIG. 2 is a flowchart of steps in a method for securing code, in accordance with some embodiments of the disclosed subject matter.

Referring now to FIG. 2, showing a flowchart of steps in a method for securing applications by wrapping code.

On step 200, a policy may be received, for example from an administrator or a security professional. The policy may define the required measures for a multiplicity of threats, including but not limited to threats related to behavior aspects of an application on a mobile device, for example whether data may be stored on the device, whether copy and paste of data is to be allowed, or the like.

On step 204 application code may be received, for example from the application server or from another source. The code may be in any programming or scripting language, including but not limited to JavaScript. As detailed below, the received code may comprise at least partial code of the application, such as one or more web pages of the application. It will be appreciated that partial code may also refer to a resource of the application such as but not limited to JavaScript (JS) files, CSS files or any other file that contains code.

The application code may then be handled in one or more ways. On step 208, a passive approach may be taken, in which the code is examined, and vulnerabilities are identified and reported, but no instructions are actually added to the code. This mode may be used, for example, during development of the application, and may be performed on the gateway server or on any other computing platform used during development.

On step 212, a dynamic active approach may be taken, in which the application code is examined at the gateway server while the application is being executed by a user on a mobile device. When a part of the code, such as a web page to be provided to the mobile device is received from the application server by the gateway server, the gateway server may intercept the page, examine the code, and wrap all instructions such as JavaScript instructions that may pose a threat, in accordance with the policy. The result of wrapping the code is a new JavaScript code that can be executed on the mobile device, either by any web browser or inside a dedicated application, web component or any other application or framework operable to execute JavaScript code. However, the code may not be allowed to perform specific actions, such as storing data, without control. Controlling the actions, which is done by the added instructions, may prevent storing altogether, enable storing the data after it is encrypted, allow managed storing, or the like. In this example, the In this example, relevant commands to be wrapped may include localStorage, sessionStorage, Web SQL storage (HTML5 SQLLite spec) and in particular "select" and "insert" or "update" SQL methods, cookie store and cookie read.

The page with the wrapped commands may then be provided to the mobile device, and on step 216 may be executed on the mobile device.

Alternatively, on step 220, a static active approach may be taken, in which the full application code is examined at the gateway server and parts thereof may be wrapped as described above. The application is optionally packaged into one file such as a zip file, and is downloaded to the mobile device and may be installed thereon prior to execution. Since the application may have to be executed by mobile devices of various types, a hybrid approach may be taken, in which the application is generic and is executed using a specific application framework that executes the generic JavaScript code. Example for such technology is PhoneGap/Cordova open source product.

On step 224 the application as wrapped may be executed on the mobile device without having to fetch web pages from the server during execution. However, the server may still be accessed by the application for fetching data, and such accesses may also comprise wrapped code.

On the two approaches discussed in association with steps 212 and 220 above, code to be provided from the application server to a mobile device either offline or online, is intercepted by a gateway server. The code is then checked for security vulnerabilities, and some of the code commands may be wrapped by additional commands, such that the wrapped code is executed by the mobile device in a secure manner.

Wrapping commands related to storing data on the device may be performed in a number of methods, such as but not limited to:

1. Wrapping the original JavaScript code with code that encrypts the data before the data is provided to the native JavaScript write command. In this case the original JavaScrypt "read" code is also wrapped so that the read data is decrypted before the result is returned.

2. Wrapping the original JavaScript code with code that sends the "to be stored" data to the gateway server, where it is encrypted and stored on the gateway server. The actual data may be replaced by a reference to the actual data on the server. In this case the read commands are also wrapped so all read data is fetched from the server based on the locally stored reference.

In both methods, the encryption/decryption key may be entered by the user, stored in memory, fetched from the gateway server, or the like, but is preferably not stored on the mobile device.

It will be appreciated that the two wrapping methods discussed above may be relevant to the dynamic and as well as to the static approaches.

Although the example above relates to storage commands, it will be appreciated that other command types may be wrapped as well, such as commands related to copy and paste; commands related to accessing the server; network commands such as AJAX and other native JavaScript network commands including HTML5 socket commands in which all data is processed first and then sent by the application to a destination controlled by the administrator, for example to the gateway server.

All cookies related commands are wrapped to ensure that cookies are controlled and data that is stored in cookies is encrypted/decrypted.

It will also be appreciated that wrapping the code is performed in accordance with applicable policies, and may take into account the application type and the specific actions. In some embodiments, the wrapping code may also take into account the identity or group association of the user, such that different wrapping commands may be added to the code depending on the specific user, on the mobile device to which the code is intended, on the geographic location which can be taken into account when wrapping "on the fly", or other parameters.

Figure 3:
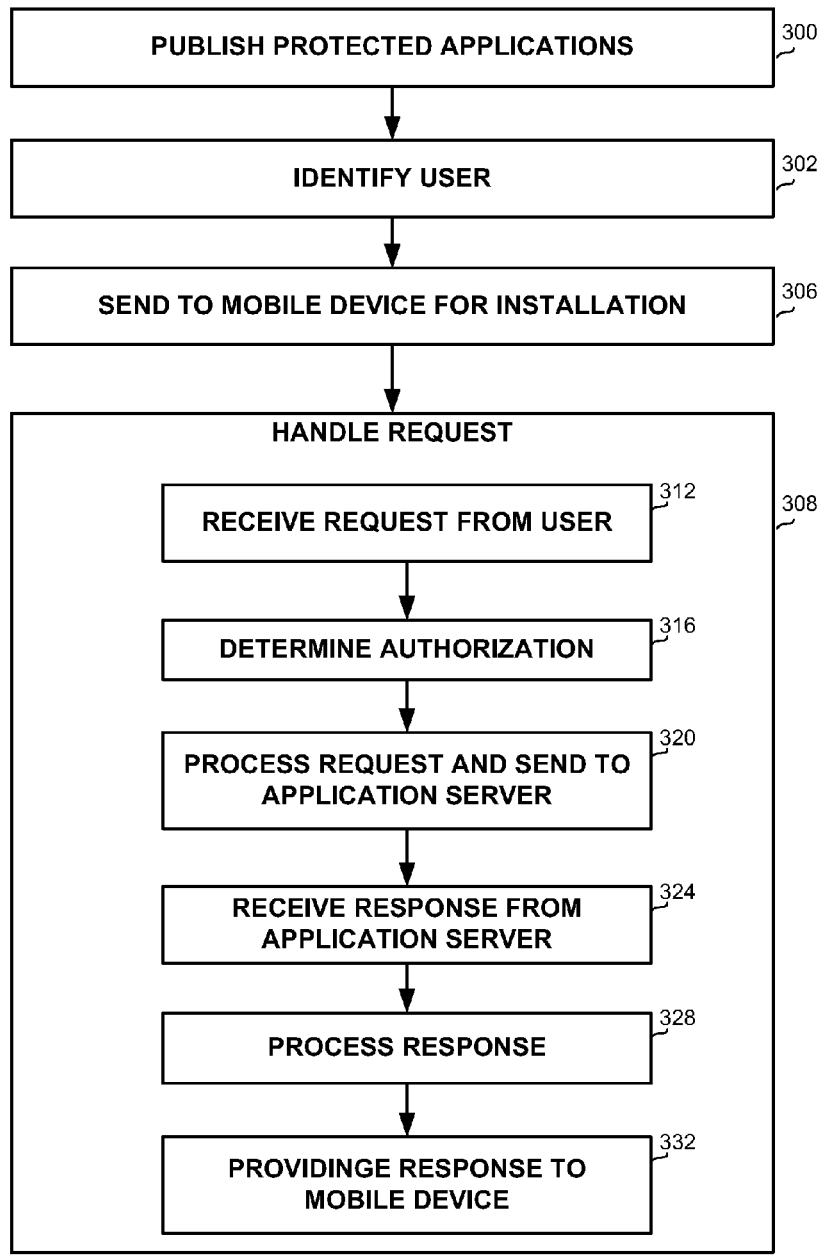
FIG. 3 is a flowchart of steps in a method for providing secure applications, in accordance with some embodiments of the disclosed subject matter.

Referring now to FIG. 3, showing a flowchart of steps in a method for consuming organization applications in a secure manner.

On step 300 one or more applications to be consumed are published on a gateway server accessible to one or more users.

The applications may be protected, e.g., some of their code may have undergone previous protection session and wrapped with commands relevant for securing actions as detailed in association with FIG. 2 above.

Each of the applications may be accessible to one or more specific users or user groups, subject to specific circumstances, or the like.

Users can access the gateway server using any web browser on their mobile device, or can be restricted by an administrator in the organization to a specific browser.

On step 302 a user accessing the gateway server is identified or the user's mobile device is authenticated before the device may display to the user the portal content (or allow access to any application).

Users that have been identified by a system or application having a corresponding security scheme, such as an e-mail application, may be identified by the already established authenticated session.

Otherwise, the gateway server may verify that all required client or server certificates or passwords are valid, thus ensuring secure connection to the portal.

It will be appreciated that the gateway server may use a third-party product or service to inspect characteristics of a specific user or content being accessed, and may block access to certain content, such as personal information, financial information, or the like.

Once authenticated, the user is redirected to a URL where the user can see and select from a list of allowed applications. The gateway application enables a user to enjoy all relevant applications, enhances with required security measures.

In optional step 306, a user may download a full application to the user's device and may install it thereon. The application may be an application whose code was previously wrapped in accordance with the description of step 220 of FIG. 2 above.

The user may then activate the application, whether it was previously installed on the device, or through the gateway server.

Step group 308 of handling requests may be repeated for any action of the application that involves access to the gateway server, such as each activation of the application or a feature thereof that requires the server.

On step 312, a request may be received from a user. The request may be related to activating an application or performing an action such as receiving information, providing data, or the like.

On step 316 the gateway server may determine whether the user is authorized to perform the specific action or to receive the requested materials in accordance with the organization policies. The policies may be based on user identity and intended privileges, and may require restricting a user or user group to only access a defined set of URLs representing specific applications or parts thereof; blocking a user access altogether, which may include blocking future sessions as well as stopping active sessions. A user may be manually blocked by an administrative action, or automatically as a result of an identified breach, high risk, or the like.

Additionally or alternatively, the policies may be based on content inspection. In such cases, authorization rules may be based on the HTTP or HTTPS content. For example, authorization may be based on keywords or a regular expression match inside a document file, on file meta data, on a file type (i.e. PDF, Word etc.), or the like. The gateway application may scan and secure all inbound and/or outbound traffic, including all content that may or may not have been downloaded to the mobile device, including documents, application proprietary data or others, although it is not stored on the device.

Additionally or alternatively, the policies may be based on geographic indications, for example in a particular geographic location of the user, certain actions may be prohibited.

If the authorization scan result is other than perfect clearance, the gateway application may take any one or more means, including but not limited to the following: block inbound or outbound traffic; alert the user or an administrator; provide limited access to data and/or operations; or prevent saving the file to the device.

It will be appreciated that the gateway server may also integrate with a third-party tool, such as an anti-virus tool to scan inbound and outbound traffic.

On step 320 the gateway server may process the request and may forward it to the application server, and on step 324 the gateway server may receive a response from the application server.

On step 328 the gateway server may further process the response in accordance with the policy, and on step 332 the gateway server may provide the response to the mobile device. It will be appreciated that providing the response to the mobile device may invoke further communication between the mobile device and the gateway server. For example, if the response does not contain the full information since some of it is encrypted on the server, an identification session may take place in order to allow the gateway server to send the content to the mobile device.

During step 320 of processing the request, or step 328 of processing the response, the gateway server may handle a multiplicity of security issues, and may take any one or more of a multiplicity of steps. Examples to such steps may include but are not limited to:

In some cases, a restricted view-only mode may be applied, in which the gateway may intercepts content and stores it on the server, optionally in an encrypted and secure manner. The gateway may then process the response to be returned to a user by replacing the content with a message that the data is not allowed on the device, or alternatively with a link from which the data can be viewed, optionally subject to authentication or applying other access control policies. The protected content as stored on the gateway server may be decrypted using a specific key for each user, wherein the key may not be stored on the gateway server but may rather be derived from a user-entered password or some other non-resident mechanism.

In further cases, the content may be viewed only with a secure application. In such cases, the protected content encrypted on the gateway server is decrypted using the user's key, and the secure application presents it, but does not let the user save it locally or copy-paste from it. Of course the user must have an ongoing authenticated session.

In further cases, the content may be viewed with any Web browser in a protective manner. In such cases, the protected content encrypted on the gateway server is decrypted using the user's key, and the web browser presents it, but does not let the user save it locally or copy-paste from it. It will be appreciated that the content may be displayed only as long as the user is within an ongoing authenticated session.

Another protection mechanism that may be utilized by the gateway may relate to preventing access to external links, such as URLs external to the organization server. In order to protect from accessing such URLs, the gateway may re-write some of the HTTP content to eliminate links to external resources and other sites. In addition, the gateway may scan the content for known threats, such as links to suspicious sites, malware, or the like. The gateway may employ a third-party tool or service to enhance specific scans.

For example of such URL protection, suppose that a gateway server supports a web application www.myapp.com that utilizes resources from other sites, for example some of the pages include a references to sub-domains such as a1.myapp.com or a2.myapp.com, or to another application www.app2.com. In order to prevent the browser from fetching data from these other URLs or from being redirected to these URLs, the gateway application may re-write the URL, thus redirecting all traffic to one or more pre-defined URLs. In most cases those URLs or IPs will be mapped to the LetMobile gateway.

In order to provide this protection, the gateway server may scan the HTML code and replace the all references links, including URLs or IP addresses with a URL or address protected by the gateway server.

In some embodiments, one or more of the protected URLs may be enhanced to include a specific identifier that identifies the original URL. For example, www.myapp.com may be mapped to the gateway URL, for example www.gateway-.com. However, since all traffic is directed to www.gateway-.com, in order to land at the specific application, an identifier may be added to indicate the specific address, for example www.gateway,com/asdjfh#ds. It will be appreciated that the identification can be added in the URL as shown above, as an HTTP/S payload and/or header (for example as a Cookie) or in any other manner.

It will be appreciated that the disclosure may relate to applications internal to the organization, i.e. stored on servers within the network of the organization, as well as external ones, such as applications deployed in a cloud.

Yet another security aspect handled by the gateway server may relate to controlling caching tags of HTTP. Organizations may determine policies defining the maximum cache time per resource type, such as but not limited to HTML, JavaScript, CSS, images or any other dynamic content generation file format such as PHP, JSP, or the like. If caching is not allowed at all, a cache timeout period of 0 may be specified.

Yet another security aspect handled by the gateway server may relate to cookies handling. The gateway server may encrypt cookies data when downloaded to the device and decrypt when uploaded back to the server. Cookie encryption/decryption may be defined per cookie name or ID. Additionally or alternatively, black list or white list of cookies may be defined by an administrator, optionally as part of a policy. Cookies in the black list or out of the white list may be removed from the HTTP payload.

Cookies can be created on the application server and read by the JavaScript code on the device. The wrapping mechanism described above may be operative for decrypting cookies created on the server, encrypted by the gateway and read on the device using JavaScript. Yet another security aspect handled by the gateway server may relate to cookie control. Based on the organization policy, the gateway application may encrypt cookies data when downloaded to the device, and decrypt them when uploaded back to the server, such that cookies received from the gateway server are not stored unencrypted.

The disclosed subject matter relates to a gateway server that buffers users from the organization server and provides security services, for ensuring that only data accesses in compliance with the organization policy are enabled. In addition, other security vulnerabilities are handled, related for example to downloading files to user devices, storing data on the user's device, securing cookies, or the like. Part of the handling may include wrapping specific instructions, such as JavaScript instructions with additional instructions, such that the wrapped code provides security means for enforcing the policies.

The user's device may be installed with a generic application providing for communicating with the server. Although in some embodiments the user may use any browser according to the user's preferences, and is not limited to using a specific or secure browser and may use whatever web browser he or she chooses, including the native out-of-the-box one. In other embodiments, administrators may require their users to use the protective application. The application may be used for authentication and document viewing, both of which may be performed more securely when using the protective application then when using a browser.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the parts of the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
   receiving a security policy associated with usage of an application by a user using a mobile device, the security policy comprising at least one vulnerability indication, wherein the security policy is determined based upon the application and an identity of a user of the mobile device;
   receiving at least partial code of the application;
   identifying at least one JavaScript instruction in the code, the at least one JavaScript instruction associated with the security vulnerability; and
   adding additional JavaScript instructions to the code for handling the security vulnerability, wherein adding the additional JavaScript instructions to the code is performed for the application prior to downloading the application to the mobile device.

2. The computer-implemented method of claim 1, wherein the at least partial code is a web page or a resource of the application.

3. The computer-implemented method of claim 1, wherein the security vulnerability relates to storing information received from the application on the mobile device.

4. The computer-implemented method of claim 1, further comprising identifying a second security vulnerability associated with at least one item selected from the group consisting of: handling cookies on the mobile device; and accessing external URLs from the mobile device.

5. The computer-implemented method of claim 1, further comprising:
   identifying a second security vulnerability associated with an attempt to download a file to the mobile device; and
   protecting the file by presenting the file to a user using a secure application or a web browser without downloading the file to the mobile device, in accordance with the security policy.

6. The computer-implemented method of claim 1, wherein the security policy is further determined based upon a geographic location of the mobile device.

7. The computer-implemented method of claim 1, wherein the method is performed by a gateway server, and wherein the mobile device and an application server communicate through the gateway server when the mobile device executes the application.

8. A computerized apparatus comprising: a hardware processor, the hardware processor being adapted to perform the steps of:
   receiving a security policy associated with usage of an application by a user using a mobile device, the security policy comprising at least one vulnerability indication, wherein the security policy is determined based upon the application and an identity of a user of the mobile device;
   receiving at least partial code of the application;
   identifying at least one JavaScript instruction in the code, the at least one JavaScript instruction associated with the security vulnerability; and
   adding additional JavaScript instructions to the code for handling the security vulnerability, wherein adding the additional JavaScript instructions to the code is performed for the application prior to downloading the application to the mobile device.

9. The apparatus of claim 8, wherein the at least partial code is a web page or resource of the application.

10. The apparatus of claim 8, wherein the security vulnerability relates to storing information received from the application on the mobile device.

11. The apparatus of claim 8, wherein the processor is further adapted to identify a second security vulnerability associated with at least one item selected from the group consisting of: handling cookies on the mobile device; and accessing external URLs from the mobile device.

12. The apparatus of claim 8, wherein the security policy is further determined based upon a geographic location of the mobile device.

13. The apparatus of claim 8, wherein the computerized apparatus is a gateway server, and wherein the mobile device and an application server communicate through the gateway server when the mobile device executes the application.

14. The apparatus of claim 8, wherein the processor is further adapted to:
   identify a second security vulnerability associated with an attempt to download a file to the mobile device; and
   protect the file by presenting the file to a user using a secure application without downloading the file to the mobile device.

15. A non-transitory computer readable medium comprising:
   instructions that when executed cause a computer to perform a process;
   a first program instruction for receiving a security policy associated with usage of an application by a user using a mobile device, the security policy comprising at least one vulnerability indication, wherein the security policy is determined based upon the application and an identity of a user of the mobile device;
   a second program instruction for receiving at least partial code of the application;
   a third program instruction for identifying at least one JavaScript instruction in the code, the at least one JavaScript instruction associated with the security vulnerability; and
   a fourth program instruction for adding additional JavaScript instructions to the code for handling the security vulnerability, wherein adding the additional JavaScript instructions to the code is performed for the application prior to downloading the application to the mobile device,
   wherein said first, second, third and fourth program instructions are stored on said non-transitory computer readable medium.

* * * * *